United States Patent [19] [11] 3,754,727
Donovan [45] Aug. 28, 1973

[54] AILERON CONTROLS
[75] Inventor: Bradford P. Donovan, Lakewood, Calif.
[73] Assignee: McDonnell Douglas Corporation, Santa Monica, Calif.
[22] Filed: Apr. 28, 1971
[21] Appl. No.: 138,087

[52] U.S. Cl. .................. 244/90 R, 74/89, 74/96, 74/469, 244/83 C
[51] Int. Cl. ............................................. B64c 9/00
[58] Field of Search ................. 244/90 R, 83, 83 A, 244/83 C, 87, 88; 74/89, 96, 469

[56] References Cited
UNITED STATES PATENTS
3,539,133  11/1970  Robertson ..................... 244/83 C
3,223,366  12/1965  Snook ........................... 244/90 R
2,697,568  12/1954  Powers ................................ 244/87
3,406,484  10/1968  Atkey et al. ...................... 74/89 X
2,699,687   1/1955  Crandall ......................... 74/469 X FOREIGN PATENTS OR APPLICATIONS
1,375,441  11/1964  France ........................... 244/90 R Primary Examiner—Evon C. Blunk
Assistant Examiner—Merle F. Maffei
Attorney—Walter J. Jason, Donald L. Royer and Robert O. Richardson

[57] ABSTRACT

A flap or slat extension controlled mechanism for engaging outboard ailerons of an aircraft during the initial part of the extension, with a capability of absorbing additional flap or slat extension input. This structure consists of a latch dwell mechanism which comprises a rotary input member, a rotary output member, a pitman of the overcenter linkage type, and a fixed abutment whereby upon rotation of the input member up to a certain angle of rotation, the output member rotates in proportion thereto but beyond that point dwells as a result of the pitman overcenter linkage coming into contact with the abutment member.

8 Claims, 9 Drawing Figures

Patented Aug. 28, 1973
3,754,727
2 Sheets-Sheet 1
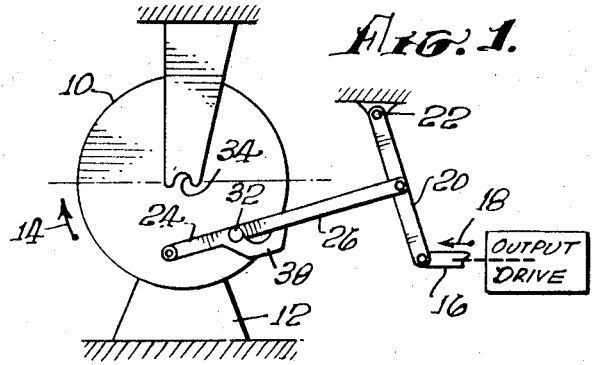
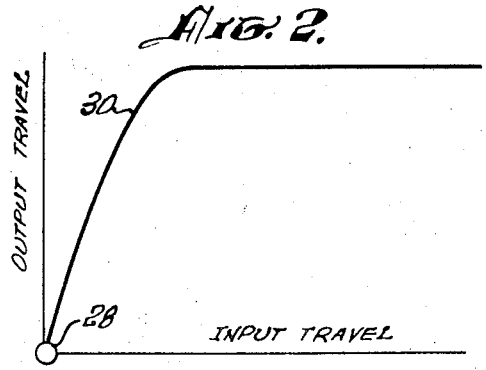
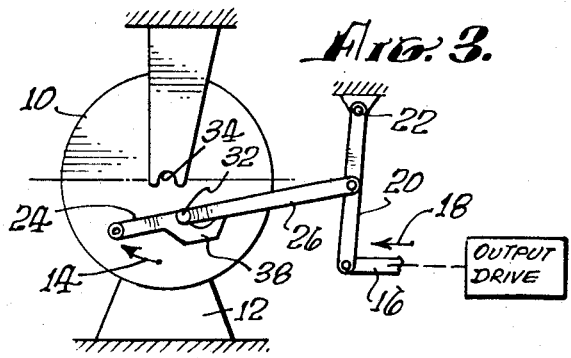
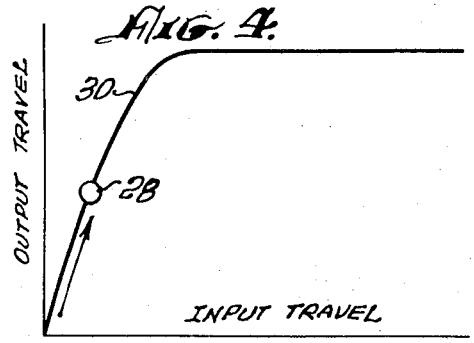
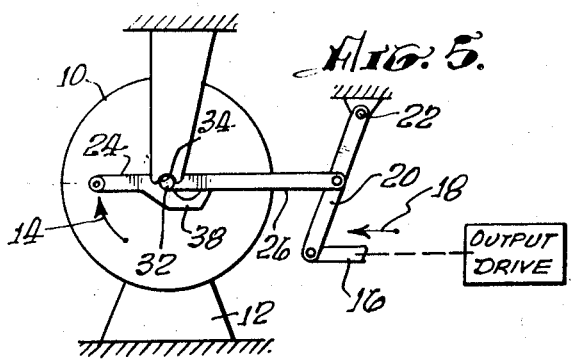
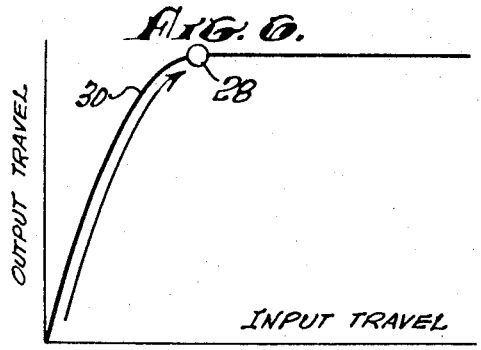
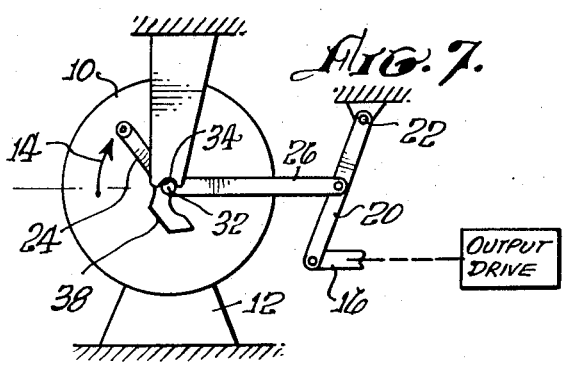
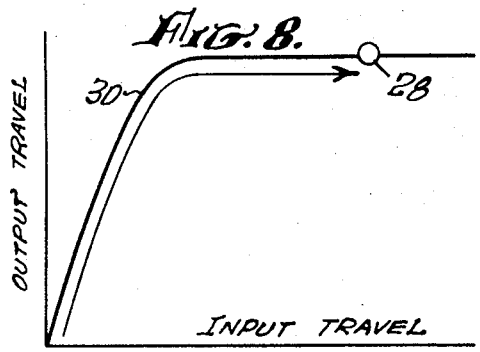
BRADFORD P. DONOVAN,
INVENTOR.
By Robert O. Richardson
ATTORNEY

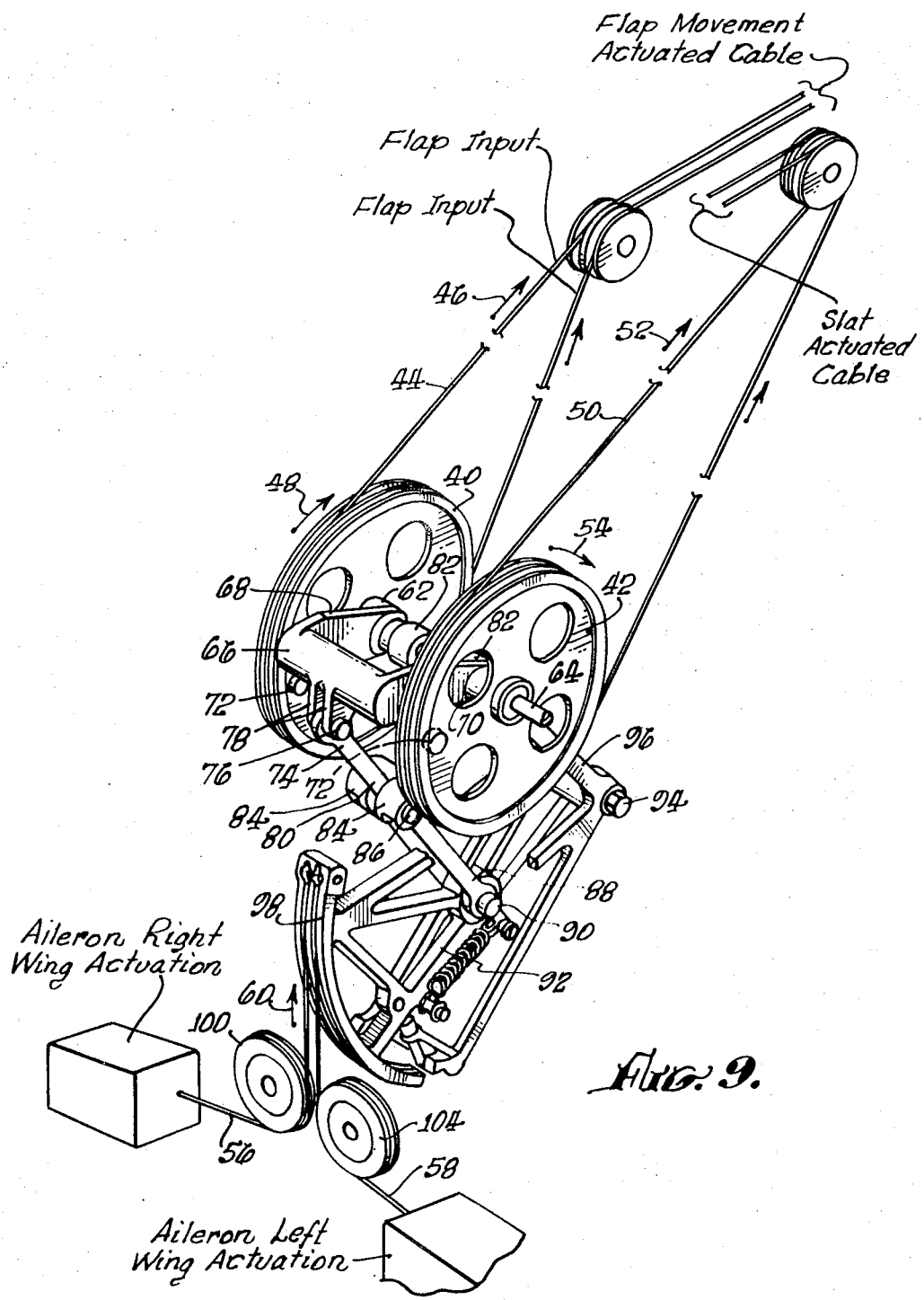

AILERON CONTROLS

BACKGROUND OF THE INVENTION

In aircraft operating over a wide range of airspeed two sets of ailerons are used. At cruise or high speeds an inboard set of ailerons provide ample roll control and at low airspeeds, both the inboard set and the outboard set of ailerons are used. The outboard ailerons are unlocked from a faired position and engage in a control system upon extension of the wing flaps or slats to a position consistent with low speed flight. The flap or slat extension used for a slow speed flight varies from relatively small extensions to a full extension such as is used upon landing. Therefore, a mechanism is required which engages the outboard ailerons during the initial part of the extension, locks in engaged position, and then dwells to absorb additional flap or slat extension input. Electromechanical and cam follower mechanisms were considered as logical approaches to meet the requirements as set forth above. However, these were discarded in favor of the latch and dwell linkage mechanism herein set forth. This is because of the lower cost and greater reliability, and the use of a simple linkage to perform the outboard aileron engagement and disengagement.

SUMMARY OF THE PRESENT INVENTION

A linkage is provided which generates a motion output normally accomplished only with a cam mechanism or with a switched electric actuator. In its simplest form a driving member is rotated by an input from the extension of either the flaps or the slats which occurs when slow speed flight is desired. A driven or output member is connected with the outboard aileron controls for their actuation. Initially, the outboard ailerons are disengaged from the control system and locked in a faired position. As the driving member is rotated, it serves as a crank. A connecting rod system connected to it causes the driven or output member to unlock the faired ailerons and initiates engagement with a roll control system. When a link in the system is driven by the crank to a point at top dead center, it locks into a detent and the aileron engagement is completed. The output or driven system then remains stationary or dwells and becomes locked as the input crank rotation continues with additional movement of the flap or slats in their further extension. In simple fashion this is accomplished by making the link rod in two segments with one segment equal in length to the crank radius. On-center locking occurs when this segment and the crank are coincident. This simplified linkage mechanism attains the desired pull-in, lock-over center, and dwell operating characteristic. Its reliability is higher and mechanical friction is lower than would be expected with a cam mechanism that otherwise would be used to achieve the above operating characteristic. Moreover, the dwell characteristic of this mechanism permits multiple units to be interconnected without requirement of a critical synchronization adjustment.

BRIEF DESCRIPTION OF THE DRAWINGS

FIG. 1 is a schematic illustration of the mechanism when the outer ailerons are in faired position and disengaged from the control system;

FIG. 2 graphically illustrates this position in an input-output relationship;

FIG. 3 is a schematic illustration when the outer ailerons are unlocked from faired position and are engaged with a roll control system;

FIG. 4 graphically illustrates this position in the input versus output travel relationship;

FIG. 5 is a schematic illustration wherein the outer ailerons become completely engaged with the roll control system as a result of the initial extension of the slat or flap input;

FIG. 6 graphically illustrates this position in the input-output travel relationship;

FIG. 7 schematically illustrates the further extension of the slat or flap mechanism constituting the input without further output movement by the outer aileron actuation control;

FIG. 8 graphically illustrates this position on the input-output travel curve; and FIG. 9 is a perspective view of the apparatus used in performing the foregoing function.

Reference is now had to the schematic illustration of FIG. 1 wherein there is shown an input driving member 10 rotatably mounted on a structure 12. Driving member 10 is rotated in a clockwise direction as shown by arrow 14 when either the flaps or slats on an aircraft wing are extended. Link 16 is the driven member which connects with the outboard aileron controls and, upon longitudinal movement in the direction of arrow 18, releases the ailerons from their faired position and connects them with suitable controls for operation. This link 16 is pivotally connected to link 20 which, in turn, is pivotally connected at 22 to a structural support. This provides a predetermined mechanical advantage in the movement of link 16. A two-piece link rod 24, 26 interconnects the driving member 10 to link 20 in such manner that a rotation of the driving member in the direction of arrow 14 is converted to a longitudinal movement of the output link 16 as shown by arrow 18. In this position link rods 24, 26 are in a straight line. Other features shown will be mentioned hereinafter with reference to other Figures.

The input-output travel relationship in FIG. 2 illustrates the condition of the apparatus as positioned in FIG. 1. This is at the start of the actuation in making the outer ailerons operable. In this position the driving member 10 and the driven or output 16 have not operated and accordingly there is no input or output travel. This position is shown by the circle 28 on the graphline 30.

In FIG. 3 the input or driving member 10 has rotated clockwise in the direction of arrow 14 relative to its position in FIG. 1. Accordingly, the output link 16 has moved to the left in the direction of the arrow 18. The apparatus is now in an operational position in which the outer ailerons may be actuated. The input-output travel has risen in linear fashion as may be seen by the position of circle 28 on the graphline 30. It should be noted that the elbow pivot 32 between links 24, 26 has not yet been seated in detent 34 which is positioned at the axis of rotation of driving member 10. This locked position is shown in FIG. 5 wherein the link 26 and hence link 16 has been fixedly retained in its extreme longitudinal position to the left. Here the elbow pivot 32 has been seated within the detent 34. At this locked position, link rods 24, 26 are still in alignment although the linear relationship of the input and output travel has just reached its peak as shown by the circle 28 on graphline 30 in FIG. 6.

Continued rotation of the driving member 10 to the position shown in FIG. 7 moves the linkage overcenter and link rod 24 assumes an over-the-center linkage relationship with link rod 26. This continued rotation in the direction of arrow 14, however, does not provide for further output travel. This condition is shown by circle 28 on line 30 in FIG. 8.

Elbow pivot 32 is provided with a stop member 38 which will permit clockwise rotation of link 24 relative to link 26 but will not permit counterclockwise rotation. Thus, while the schematic illustrations shown and described have demonstrated how the output 16 is moved to the left, in the direction of arrow 18, it should be obvious that when the slats or flaps are retracted and the rotation of the input pen is counterclockwise, the link rods 24, 26 assume alignment and exert a compressive force which will cause the output or driven member 16 to move to the right in FIG. 7. This movement will disconnect the outer aileron from its controls and restore the outer aileron to its faired position. This is desirable in the inactivation of the outer ailerons such as when the aircraft is in its cruise mode.

Having thus described the theory of operation of the structure in its various positions, reference is now made to FIG. 9 wherein is shown a perspective representation of the structure of one embodiment. Here there is shown two pulleys 40 and 42, either of which may serve as the input or driving member. Pulley 40 may be actuated by a cable 44 which is responsive to flap movement. When the flaps are extended, cable 44 moves in the direction of arrow 46 and pulley 40 rotates clockwise in the direction of arrow 48. Similarly, cable 50 may be pulled in the direction of arrow 52 upon extension of the slats and pulley 42 is then rotated clockwise in the direction of arrow 54. Upon either of these movements the apparatus in FIG. 9 is designed to pull cables 56 and 58 inwardly and upwardly in the direction of arrow 60 to thus release the outer ailerons from their faired position and to engage them for operation. The opposite rotation of pulleys 40 or 42, which will occur when both the flaps and the slats have been retracted, will thus permit cables 56 and 58 to be retracted in a direction opposite to that of arrow 60. This action results in locking of the outer ailerons in a faired or fixed position. The structure between the pulleys 40, 42 and the cables 56, 58 will now be explained.

Pulleys 40 and 42 are rotatably mounted on axles 62, 64 which are spaced apart but in axial alignment. Mounted between the pulleys on both axles is a U-shaped crank 66 affixed to the axles at the ends of crank arms 68, 70. Each pulley has an inwardly directed projection 72 which abuts crank arms 68, 70 on pulley rotation. Thus, rotation of either pulley in a clockwise direction will cause clockwise rotation of crank 66.

A spiral spring connects between pulley 40 and crank 66 to provide a counterclockwise force on crank 66 against projections 72 of pulley 40. Thus, if the slats are extended while the flaps are not, to rotate the mechanism to a dwell position using pulley 42 only, the spring provides a counterclockwise force to hold projection 72 on pulley 42 firmly against crank 66 for the return stroke. A link 74 is pivotally mounted at 76 to ears 78 on crank 66. Link 74 has a length equal to the distance from mount 76 to the axis of crank arms 68, 70 so that its lower end 80 would pass through the axis of the axles 62, 64 on rotation. Lugs 82 extend inwardly on axles 62, 64 and ears 84 extend outwardly from end 80 of link 74 to stop end 80 at the pulley axis when pulleys 40, 42 continue to rotate in the clockwise direction.

Link 74 is pivotally connected at 86 to a second link 88 which in turn is pivotally connected at 90 to actuate a pivotally mounted sector 92. This sector 92 is pivotally mounted at 94 on an axis spaced by link 96 from axles 62, 64. This sector has an arcuate outer rocker arm 98 to which cables 56, 58 are attached. Whenever either pulley 42 is rotated clockwise in the direction of arrow 54 or pulley 40 is rotated clockwise in the direction of arrow 48, links 74 and 88 cause an upward movement of the outer rocker arm 98 of sector 92, in the direction of arrow 60. This pulls aileron actuation cables 56, 58 upwardly about pulleys 100, 102 and thus inwardly to place the outer ailerons in operable condition.

When the ears 84 on link 74 abut against the lugs 82 as link 74 passes over the center of the pulleys 40, 42 link 74 pivots around lug 82 from its alignment with link 88 as either pulley 40 or 42 is rotated further clockwise. Such continued rotation thus causes no further movement of sector 92 or the cables 56, 58 that are attached thereto. Thus it can be seen that it is the initial extension of either the slats or flaps that cause the engagement of the outer ailerons for actuation and their further extension has no additional effect.

I claim:

1. In an airplane, wings for supporting said airplane, said wings having slats along the leading edge thereof and flaps along the trailing edge thereof, slat means for extending said slats, flap means for extending said flaps, said wings having inboard and outboard sets of ailerons and actuation controls therefore, said outboard ailerons being locked in faired position and inoperable by said actuation controls until extension of said slats and flaps, apparatus for engaging said outer ailerons to said actuation controls during the initial part of either of said extensions, said apparatus comprising:
rotatable means rotatably responsive to flap and slat extension,
driven member means for connecting said outer ailerons to their actuation controls,
linkage means operatively connecting said rotatable means with said driven member means for actuation thereof for a predetermined degree of rotation of said rotatable means, said linkage means locking said driven member means in a predetermined position as said rotatable means exceeds said predetermined degree of rotation.

2. Apparatus as set forth in claim 1 wherein said linkage means includes a crank with pitman overcenter linkage affixed thereto for initial movement of said driven member before said linkage is moved to its overcenter position.

3. Apparatus as set forth in claim 1 wherein said rotatable means includes a pair of pulleys each of which rotates independently of the other,
said pulleys being in spaced axial alignment and having inwardly directed projections thereon,
said linkage means including a crank having a pair of arms each engageable by a projection on one of said pulleys, whereby rotation of either pulley actuates said crank.

4. Apparatus as set forth in claim 1 wherein said linkage means includes a pair of interconnected links, one link of which is connected to said rotatable means and the other link to said driven member means, said one link being of a length and connected to said rotatable means such that the interconnection between said links passes to a point of axial alignment with the axis of rotation of said rotatable means.

5. Apparatus as set forth in claim 4, and stop means at said point to prevent further movement of said links intersection whereby said one link continues rotation as said rotatable means is rotated without further movement of said other link.

6. Apparatus as set forth in claim 5 wherein said stop means includes inwardly directed lugs at the axis of said pulleys engageable with said links.

7. Apparatus as set forth in claim 1 wherein said driven member means includes a pivotally mounted sector pivotally movable in response to movement of said linkage means, and a cable connected to said sector for movement thereby.

8. Apparatus as set forth in claim 7 wherein said sector pivots vertically about a horizontal axis, a pair of pulleys having spaced parallel horizontal axes normal to said sector horizontal axis, cables extending laterally from said pulleys to aileron actuation controls and upwardly from said pulleys to said sector, said sector having an arcuate outer rocker arm for maintaining said cables in alignment with said pulleys when said sector is moving about its pivotal axis.

* * * * *